(12) United States Patent
Sun et al.

(10) Patent No.: US 9,214,825 B2
(45) Date of Patent: Dec. 15, 2015

(54) APPARATUS FOR CHARGING BATTERY IN ELECTRIC VEHICLE

(71) Applicant: LSIS CO., LTD., Anyang-si, Gyeonggi-do (KR)

(72) Inventors: Jong In Sun, Incheon (KR); Woo Sup Kim, Seoul (KR); Chun Suk Yang, Seongnam-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 446 days.

(21) Appl. No.: 13/719,704

(22) Filed: Dec. 19, 2012

(65) Prior Publication Data

US 2013/0169212 A1 Jul. 4, 2013

(30) Foreign Application Priority Data

Dec. 30, 2011 (KR) ........................ 10-2011-0147302

(51) Int. Cl.
*H02J 7/00* (2006.01)
*H02M 3/335* (2006.01)
*H02M 3/337* (2006.01)
*B60L 11/18* (2006.01)
*H02M 1/00* (2007.01)

(52) U.S. Cl.
CPC ............ *H02J 7/0054* (2013.01); *B60L 11/1868* (2013.01); *H02M 3/3378* (2013.01); *H02M 3/33592* (2013.01); *B60L 2210/12* (2013.01); *B60L 2210/30* (2013.01); *B60L 2210/42* (2013.01); *B60L 2240/547* (2013.01); *H02J 2007/0059* (2013.01); *H02M 2001/0074* (2013.01); *Y02T 10/7005* (2013.01); *Y02T 10/7066* (2013.01); *Y02T 10/7233* (2013.01); *Y02T 10/7241* (2013.01); *Y02T 90/127* (2013.01)

(58) Field of Classification Search
CPC ............ H02J 7/0054; H02M 3/33592; H02M 3/3378; H02M 2001/0074; B60L 11/1868; B60L 2210/12; B60L 2210/30; B60L 2210/42; B60L 2240/547; Y02T 10/7066; Y02T 90/127; Y02T 10/7005; Y02T 10/7241; Y02T 10/7233
See application file for complete search history.

(56) References Cited

U.S. PATENT DOCUMENTS

| | | | | |
|---|---|---|---|---|
| 6,404,151 | B1 * | 6/2002 | Bader | 318/39 |
| 6,574,125 | B2 * | 6/2003 | Matsukawa et al. | 363/71 |
| 6,714,428 | B2 * | 3/2004 | Huang et al. | 363/89 |
| 6,982,887 | B2 * | 1/2006 | Batarseh et al. | 363/89 |
| 7,466,116 | B2 * | 12/2008 | Sato et al. | 323/285 |
| 7,605,563 | B2 * | 10/2009 | Kanno et al. | 320/123 |
| 7,821,799 | B2 * | 10/2010 | Jacobs | 363/47 |
| 2001/0011885 | A1 * | 8/2001 | Nakagawa | 323/224 |

FOREIGN PATENT DOCUMENTS

| | | |
|---|---|---|
| CN | 1764036 | 4/2006 |
| JP | 07-121249 | 5/1995 |
| JP | 10-323032 | 12/1998 |
| JP | 11-008910 | 1/1999 |
| JP | 2000-324829 | 11/2000 |
| JP | 2003-153532 | 5/2003 |
| JP | 2003-164151 | 6/2003 |
| JP | 2011-176959 | 9/2011 |

\* cited by examiner

*Primary Examiner* — Naum B Levin
(74) *Attorney, Agent, or Firm* — Lee, Hong, Degerman, Kang & Waimey

(57) ABSTRACT

Provided is an apparatus for charging battery in electric vehicle that includes a DC-DC converter unit formed in two channels for converting a charge of the low voltage battery to a power source by receiving a power source from the high voltage battery.

5 Claims, 4 Drawing Sheets

APPARATUS FOR CHARGING BATTERY IN ELECTRIC VEHICLE

CROSS-REFERENCE TO RELATED APPLICATIONS

Pursuant to 35 U.S.C. §119 (a), this application claims the benefit of earlier filing date and right of priority to Korean Patent Application No. 10-2011-0147302, filed on Dec. 30, 2011, the contents of which are hereby incorporated by reference in their entirety.

BACKGROUND OF THE DISCLOSURE

1. Field of Endeavor

The present disclosure relates to an apparatus for charging in electric vehicle.

2. Background

This section provides background information related to the present disclosure which is not necessarily prior art.

General vehicles suffer from discharge of environmental hazardous materials such as carbon monoxide, carbon dioxide and exhaust gas because general vehicles use gasoline, fuel gas and the like. Recently, in order to solve the an environmental pollution resulting from an exhaust gas of vehicles, depletion of fossil fuel, and the like, environmentally-friendly vehicles, such as electric vehicles or a hybrid vehicles (referred to as 'electric vehicles', hereinafter) using an electric motor as a power source or an auxiliary power source are on the rise in their expectation for mass production and popularization. Particularly, requirement of high efficiency and high performance automotive application components for electric vehicles are on the increase.

Thus, there is a need to develop a high efficiency converter as a device for charging a low-voltage battery of typically a 110 Vdc or 220 Vdc power source by receiving an input voltage of 150Vdc or 300Vdc from a high voltage battery mounted inside an electric vehicle.

SUMMARY OF THE DISCLOSURE

This section provides a general summary of the disclosure, and is not a comprehensive disclosure of its full scope or all of its features.

Systems consistent with the present disclosure provide an apparatus for charging battery in electric vehicle that guarantee efficiency and stability.

It should be emphasized, however, that the present disclosure is not limited to a particular disclosure as explained above. It should be understood that other technical subjects not mentioned herein may be appreciated by those skilled in the art.

In one general aspect of the present disclosure, there is provided an apparatus for charging a low-voltage battery by using a power source of a high voltage battery, the apparatus comprising: a DC-DC converter unit formed in two channels for converting a charge of the low voltage battery to a power source by receiving a power source from the high voltage battery; and an output unit connected to the low voltage battery by being connected to each of the DC-DC converters formed in two channels, wherein each of DC-DC converter unit formed in two channels comprises a switching unit switching a phase difference by receiving a power source from the high voltage battery, a transformer unit connected to an output terminal of the switching unit to reduce a voltage of an output of the switching unit, a rectifying unit converting the output of the transformer unit to a DC voltage after rectifying the output of the transformer unit, and a filter unit connected to the output unit to filter the output of the rectifying unit.

In some exemplary embodiments, each of the two-channeled switching units may be connected in series.

In some exemplary embodiments, the rectifying unit and the filter unit may include a current doubler.

In some exemplary embodiments, the filter unit may include a coupled inductor formed in two windings on one core.

In some exemplary embodiments, the switching unit may be formed by a full-bridge method or a half-bridge method.

In some exemplary embodiments, the rectifying unit may include two MOSFETs or two diodes.

In some exemplary embodiments, the switching unit of the DC-DC converter unit of each channel may include a plurality of switching elements, wherein the switching element of a first channel and the switching element of a second channel have a 90-degree phase difference respectively.

The apparatus for charging battery in electric vehicle according to exemplary embodiments of the present disclosure has an advantageous effect in that it can reduce a rated internal pressure and simplify a configuration to thereby obtain cost efficiency effect and a space reduction effect.

Another advantageous effect is that ripples of an output current can be reduced and inductors can be reduced by using a coupled inductor to reduce the size of a filter unit and weight and size of a product.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Hereinafter, an apparatus for charging battery in electric vehicle according to exemplary embodiments of the present disclosure will be described in detail with reference to the accompanying drawings.

Figure 1:
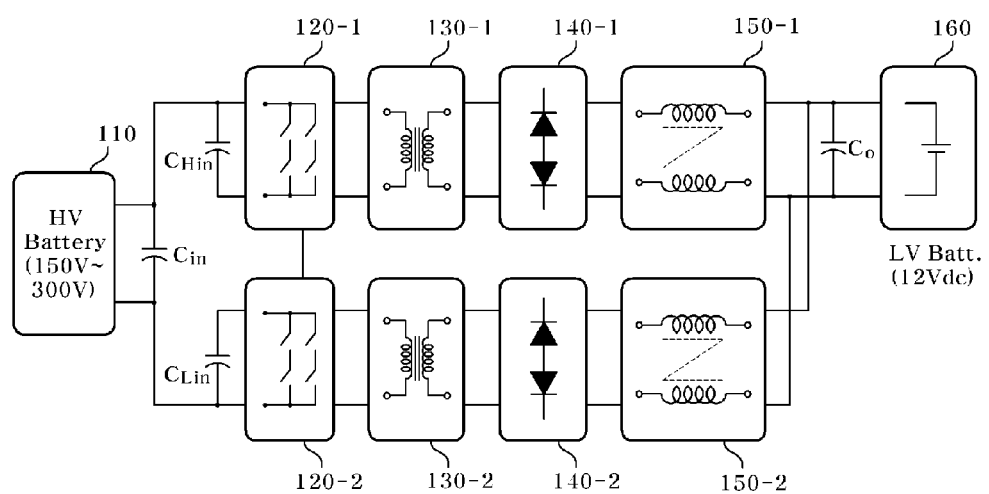
FIG. 1 is a schematic block diagram illustrating an apparatus for charging a battery in electric vehicle according to an exemplary embodiment of the present disclosure.
Figure 2:
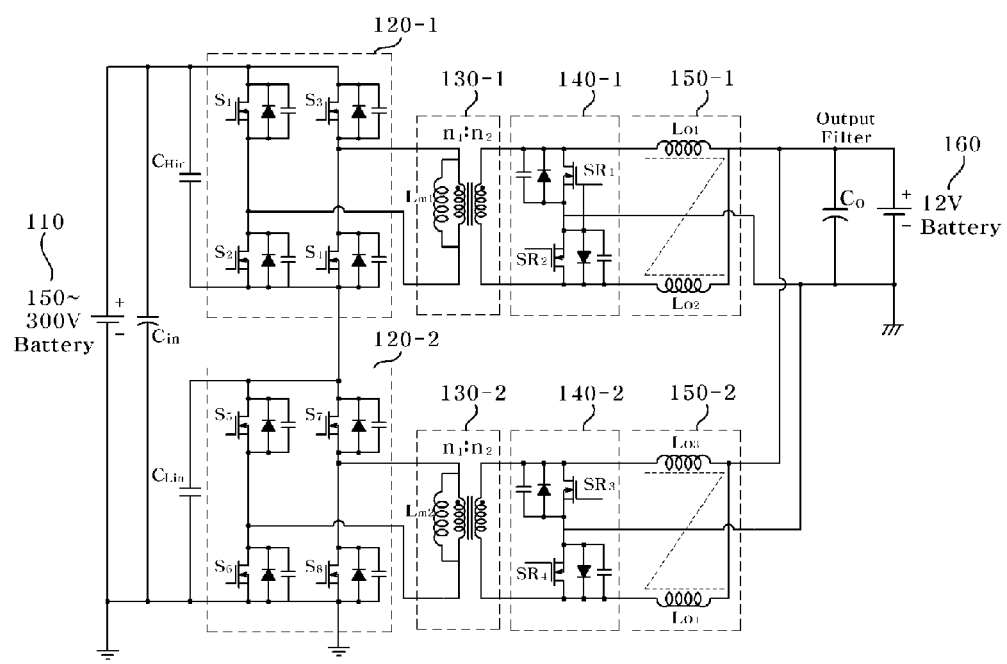
FIG. 2 is a circuit diagram illustrating an apparatus for charging a battery in electric vehicle according to an exemplary embodiment of the present disclosure.
Figure 3A:
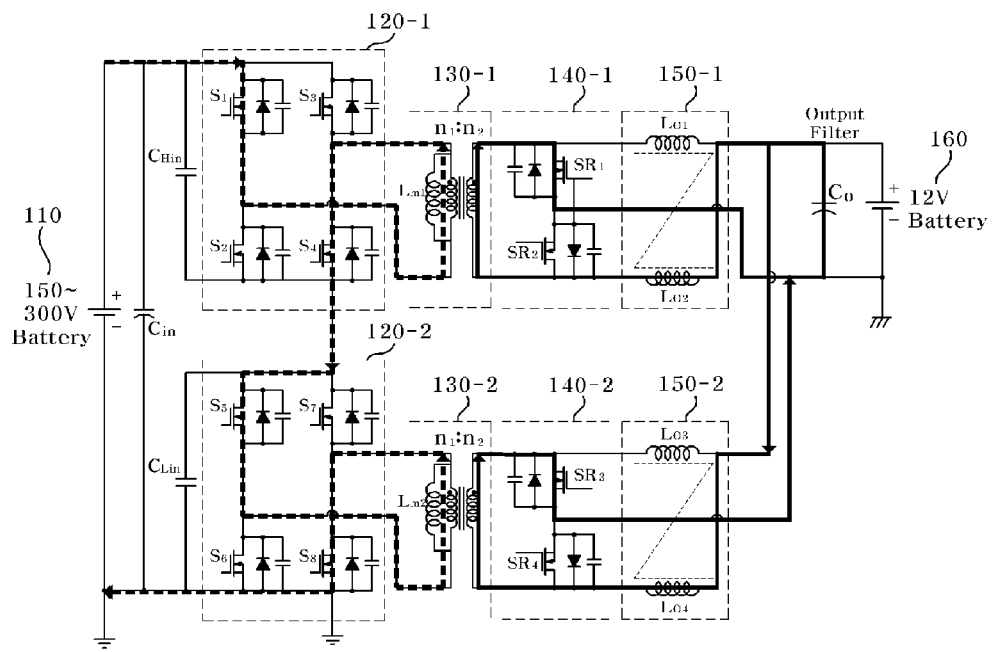
FIGS. 3a and 3b are schematic views illustrating a current flow of an apparatus for charging battery in electric vehicle according to an exemplary embodiment of the present disclosure.
Figure 3B:
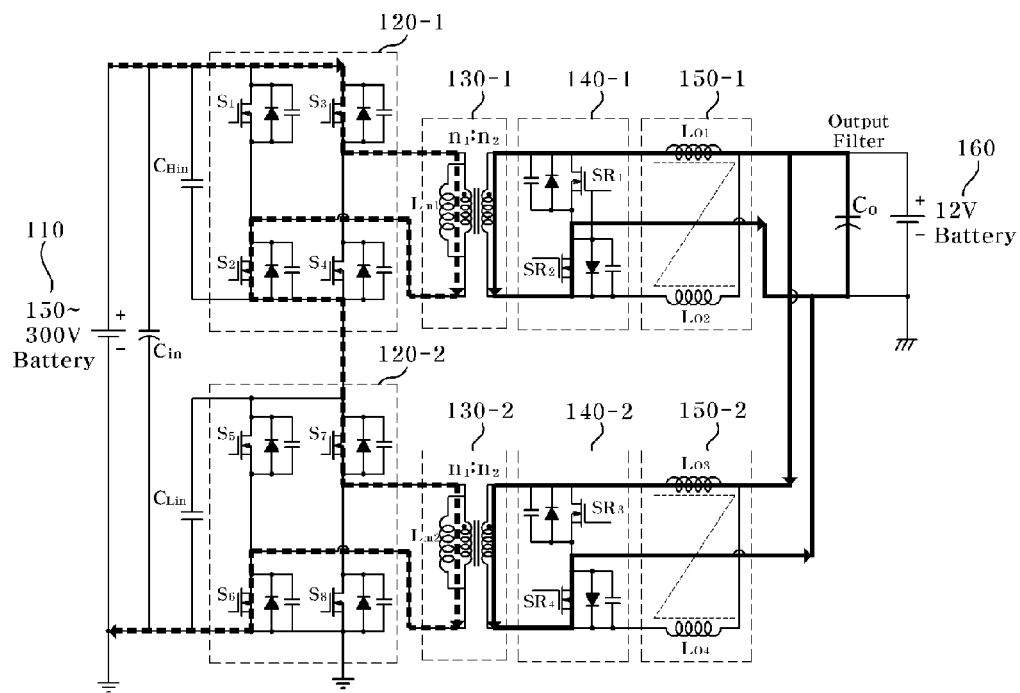

FIG. 1 is a schematic block diagram illustrating an apparatus for charging a battery in electric vehicle according to an exemplary embodiment of the present disclosure;

FIG. 2 is a circuit diagram illustrating an apparatus for charging a battery in electric vehicle according to an exemplary embodiment of the present disclosure;

FIGS. 3a and 3b are schematic views illustrating a current flow of an apparatus for charging battery in electric vehicle according to an exemplary embodiment of the present disclosure.

The apparatus for charging a battery in electric vehicle according to an exemplary embodiment of the present disclosure (hereinafter referred to as "apparatus") comprises a high voltage battery (110), switching units (120-1, 120-2) converting a DC power source to an AC power source by switching the DC power source, transformer units (130-1, 130-2) voltage-dropping the AC power source outputted from the switching units (120-1, 120-2), rectifying units (140-1, 140-2) rectifying charge-reduced or voltage-transformed power source to a DC power source, filter units (150-1, 150-2) filtering the rectified power source, and a low voltage battery (160) charging a power source by receiving the power source outputted from the filter units (150-1, 150-2).

Referring to FIG. 1, each two switching units (120), transformer units (130), rectifying units (140) and filter units (150) are provided, which means that two the DC-DC converter units each including the switching unit (120), the transformer unit (130), the rectifying unit (140) and the filter unit (150) are provided, or the DC-DC converter unit is configured in two channels.

That is, the apparatus for charging the low voltage battery (160) using a power source of the high voltage battery (110) according to an exemplary embodiment of the present disclosure includes a DC-DC converter unit configured in two channels connected to an output terminal of the high voltage battery (110) for converting a power source to charge the low voltage battery (160) by receiving a power from the high voltage battery (110), and an output unit connected to each of the DC-DC converter units formed in two channels and connected to the low voltage battery (160).

Each of the DC-DC converter units may include a switching unit (120) for being switched by a phase difference by receiving a power source from the high voltage battery (110), a transformer unit (130) for reducing a voltage of an output of the switching unit by being connected to an output terminal of the switching unit (120), a rectifying unit (140) converting the output from the transformer unit (130) to a DC voltage by rectifying the output from the transformer unit (130), and a filter unit (150) connected to an output unit by filtering the output of the rectifying unit (140).

Meanwhile, as shown in FIG. 1, it can be noted that the switching units (120-1, 120-2) are connected in series. The serial connection is a measure intended to withstand the voltage from the high voltage battery (110) at an input terminal. In a case two switching units (120-1, 120-2) are mounted, a half of the rated current flows in each of the switching unit. Thus, a voltage input from the high voltage battery (110) can be distributed or shared at the input terminal of the apparatus, whereby an internal voltage can be reduced.

Furthermore, as illustrated in FIG. 1, the rectifying units (140-1, 140-2) and the filter units (150-1, 150-2) may be configured in a current doubler method. Particularly, the proposed current doubler method is advantageous in view of the fact that a charging system for an electric vehicle requires a low output voltage but a high DC current.

The filter units (150-1, 150-2) may reduce an inductance value of an inductor and also reduce a volume by using a coupled inductor. The coupled inductor may be an inductor formed by winding a plurality of windings on one core.

An important factor having a greatest influence on the conversion efficiency in a low voltage/large current type DC-DC converter is a conduction loss at an output terminal of the converter, where the conduction loss may be reduced by using the coupled inductor. Furthermore, the coupled inductor can flow the large current by distribution, whereby a thermal dispersion effect can be induced and ripples in an output current can be significantly reduced.

In addition, the switching units (120-1, 120-2) may be configured with a full-bridge type switching module of four (4) switching elements or a half-bridge type switching module configured with two switching elements. At this time, the switching element may be a MOSFET (Metal-Oxide-Semiconductor Field-Effect Transistor) or a diode. However, the present disclosure is not limited thereto, and any element capable of performing a switching operation may be used.

Meanwhile, each of the DC-DC converter unit includes two (2) switching units (120-1, 120-2), each connected in series, and may be referred to a DC-DC converter unit configured with two channels. The switching units (120-1, 120-2) of each channel of the DC-DC converter unit are respectively configured with four (4) switching elements or two (2) switching elements. The switching units belonging to respectively different channels may be configured to have a phase difference of 90°.

In other words, a switching unit of a first channel and a switching unit of a second channel may perform a switching ON/OFF operation with a mutually different phase. Furthermore, the rectifying units (140-1, 140-2) may be configured with two MOSFETs (Metal-Oxide-Semiconductor Field-Effect Transistors) or two diodes.

FIG. 2 is a circuit diagram illustrating an apparatus for charging a battery in electric vehicle according to an exemplary embodiment of the present disclosure, where FIG. 2 illustrates a schematic view of the apparatus for charging a battery in electric vehicle according to an exemplary embodiment of the present disclosure illustrated in FIG. 1 in an actual circuit or an actual element.

The switching units (120-1, 120-2) in the apparatus are two-channel serially connected full bridge switching circuit having four switching elements (S1~S4 or S5~S8) and is a switching circuit adjustable in each channel by a simple method. However, although FIG. 2 has illustrated a full bridge switching circuit, the apparatus may be configured with a half bridge type switching circuit.

The switching units (120-1, 120-2) are configured with a plurality of full bridge converters formed with four (4) switching elements to switch an input DC power source (Vdc) of each high voltage battery.

In the same context as that thus illustrated, a channel of an upper end in FIG. 2 is referred to as a first channel, and a channel of a lower end is referred to as a second channel. Each switching element of the switching units (120-1, 120-2) may be switched with a phase difference. That is, four switching elements of the first channel switching unit (120-1) in FIG. 2 may be operated and shifted by a phase difference of 90° from four switching elements of the second channel switching unit (120-2) in FIG. 2. The switching units (120-1, 120-2) may be operated by an individual adjustment of phase difference in order to avoid a short-circuit phenomenon caused by being conducted among the switching elements.

Now, the operation of the switching units (120-1, 120-2) will be described in more detail.

FIG. 3a is a schematic view illustrating a current flow of an apparatus for charging battery in electric vehicle according to an exemplary embodiment of the present disclosure. To be more specific, a current flow of the apparatus related to the operation of the switching units (120-1, 120-2).

In a case all the switching elements (S1 and S4) of the switching units (120-1, 120-2) are in a switched ON state, an input current flows in the switching element S1 to store energy in a magnetized inductor (Lm1) at a primary side of the transformer unit (130-1). Furthermore, the switching elements (S5 and S8) phase-shifted by 90° over the switching element S1 may maintain a switched ON state. The energy flowing through the magnetized inductor (Lm1) passes the switching element S4 and a current having passed the switching element S4 flows in the switching element S5 in the same manner as in the first channel to store energy in a magnetized inductor (Lm2) at a secondary side of the transformer unit (130-2) and passes the switching element S8 to be discharged to a ground at an input side.

FIG. 3b is a schematic view illustrating a current flow of an apparatus for charging battery in electric vehicle according to an exemplary embodiment of the present disclosure. Referring to FIG. 3b, in a case all the switching elements S2 and S3 are in a switched ON state, the 90° phase-shifted switching elements S6 and S7 are also switched on. That is, FIG. 3b illustrates a current flow to the switching elements S6 and S7, where an input current flows in the switching element S3 and flows through the switching element S2 via the transformer unit (130-1).

The transformer unit (130-1) of the first channel and the transformer unit (130-2) of the second channel are switched on/off at the first channel switching unit (120-1) and the second channel switching unit (120-2) to induce a voltage at the primary side of the transformer unit (1301-1), where the induced voltage causes a voltage to be generated at the secondary side of the transformer unit (130-2) in an interaction with the transformer, and to be rectified to a DC voltage through the rectifying units (140-1, 140-2).

An important factor having a greatest influence on the conversion efficiency in a low voltage/large current type converter is a conduction loss at an output terminal of the converter, and in order to reduce the conduction loss, it is effective that an inductor coupled to an output terminal of a rectifying unit is used as a filter unit to reduce an inductance value of the inductor and to reduce the volume (size) as well. Furthermore, an inductor coupled to the filter unit of an output terminal is inserted to allow a large sized output current flowing in a divisive manner, whereby a thermal dispersion effect and an output ripple current can be alleviated.

As shown in FIG. 3a, in a case the switching elements (S1, S4, S5, S8) of the switching units (120-1, 120-2) are in a switched on state, switching elements (SR1, SR3) of the rectifying units (140-1, 140-2) may be switched on to form a closed loop as shown in FIG. 3a.

Furthermore, in a case the switching elements (S2, S3, S6, S7) of the switching units (120-1, 120-2) are in a switched on state, switching elements (SR2, SR4) of the rectifying units (140-1, 140-2) may be switched on to form a closed loop as shown in FIG. 3b.

The above-mentioned apparatus for charging battery in electric vehicle according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. An apparatus for charging a low-voltage battery by using power from a high voltage battery, the apparatus comprising:
   a DC-DC converter unit formed as two channels for converting a charge of the low voltage battery to a power source by receiving the power from the high voltage battery; and
   an output unit connected to the low voltage battery via the DC-DC converter unit,
   wherein each of the two channels of the DC-DC converter unit includes:
   a switching unit switching a phase difference by receiving the power from the high voltage battery;
   a transformer unit connected to an output terminal of the switching unit to reduce an output voltage of the switching unit;
   a rectifying unit rectifying and converting an output of the transformer unit to a DC voltage; and
   a filter unit connected to the output unit to filter an output of the rectifying unit, the filter unit comprising a coupled inductor formed as two windings on one core, and
   wherein the rectifying unit and the filter unit of each of the two channels are configured in a current doubler method.

2. The apparatus of claim 1, wherein the switching unit of each of the two channels is connected in series.

3. The apparatus of claim 1, wherein each switching unit is formed by a full-bridge method or a half-bridge method.

4. The apparatus of claim 1, wherein each rectifying unit includes two MOSFETs or two diodes.

5. The apparatus of claim 1, wherein:
   each switching unit comprises a plurality of switching elements; and
   a switching element of a first of the two channels and a switching element of a second of the two channels have a 90-degree phase difference.

* * * * *